United States Patent
Gee et al.

(10) Patent No.: US 12,399,993 B2
(45) Date of Patent: *Aug. 26, 2025

(54) RECOVERING INFECTED SNAPSHOTS IN A SNAPSHOT CHAIN

(71) Applicant: Rubrik, Inc., Palo Alto, CA (US)

(72) Inventors: Adam Gee, San Francisco, CA (US); Surendar Chandra, Sunnyvale, CA (US); Gregory Robert Johnston, Mountain View, CA (US); Ishaan Sang, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/980,652

(22) Filed: Nov. 4, 2022

(65) Prior Publication Data

US 2023/0142613 A1 May 11, 2023

Related U.S. Application Data

(60) Provisional application No. 63/421,536, filed on Nov. 1, 2022, provisional application No. 63/319,953, filed on Mar. 15, 2022, provisional application No. 63/276,822, filed on Nov. 8, 2021.

(51) Int. Cl.
*G06F 21/56* (2013.01)
*G06F 11/14* (2006.01)
*G06F 16/14* (2019.01)
*G06F 21/53* (2013.01)

(52) U.S. Cl.
CPC ........ *G06F 21/565* (2013.01); *G06F 11/1435* (2013.01); *G06F 11/1469* (2013.01); *G06F 16/156* (2019.01); *G06F 21/53* (2013.01); *G06F 21/56* (2013.01); *G06F 21/568* (2013.01);
(Continued)

(58) Field of Classification Search
None
See application file for complete search history.

(56) References Cited

U.S. PATENT DOCUMENTS

| 8,495,037 B1 * | 7/2013 | Westenberg ............ G06F 21/56 |
| | | 707/698 |
| 9,218,252 B1 | 12/2015 | Revur et al. |
| 10,650,146 B1 | 5/2020 | Gaurav et al. |

(Continued)

OTHER PUBLICATIONS

U.S. Appl. No. 17/980,645, filed Nov. 4, 2022, Pending, Indicating Infected Snapshots in a Snapshot Chain.
(Continued)

*Primary Examiner* — Younes Naji
(74) *Attorney, Agent, or Firm* — Holland & Hart LLP

(57) ABSTRACT

Subject matter related to data management is disclosed. A most recent snapshot in a snapshot chain that is not infected by malware may be identified based on mounting snapshots in the snapshot chain and determining whether the snapshots are infected. A selection of an infected snapshot may be received, where the infected snapshot may be more recent than the identified most recent snapshot. The selected infected snapshot may be mounted. Based on mounting the infected snapshot, a determination of which content in the selected snapshot are not infected may be made. Based on determining which content in the selected snapshot is not infected, at least one of the non-infected content may be recovered.

18 Claims, 10 Drawing Sheets

(52) U.S. Cl.
CPC .... *G06F 2201/84* (2013.01); *G06F 2221/032* (2013.01); *G06F 2221/034* (2013.01)

(56) References Cited

U.S. PATENT DOCUMENTS

| | | | |
|---|---|---|---|
| 10,887,339 | B1 | 1/2021 | Sokolov et al. |
| 11,681,591 | B2 | 6/2023 | Kulaga et al. |
| 2007/0245105 | A1 | 10/2007 | Suzuki et al. |
| 2011/0197279 | A1 | 8/2011 | Ueoka |
| 2019/0235973 | A1 | 8/2019 | Brewer et al. |
| 2019/0354443 | A1 | 11/2019 | Haustein et al. |
| 2020/0159624 | A1 | 5/2020 | Malkov et al. |
| 2020/0201998 | A1* | 6/2020 | Jung .................. G06F 11/3037 |
| 2020/0226256 | A1* | 7/2020 | Gaurav ................ G06F 21/565 |
| 2020/0319979 | A1* | 10/2020 | Kulaga ............... G06F 11/3006 |
| 2021/0044604 | A1 | 2/2021 | Annen et al. |
| 2021/0240828 | A1 | 8/2021 | Gaurav et al. |
| 2022/0100378 | A1* | 3/2022 | Borate .................. G06F 21/568 |
| 2022/0245250 | A1 | 8/2022 | Warwick et al. |
| 2022/0345473 | A1 | 10/2022 | Kare et al. |

OTHER PUBLICATIONS

U.S. Appl. No. 17/980,676, filed Nov. 4, 2022, Pending, Quarantining Information in Backup Locations.
U.S. Appl. No. 17/980,752, filed Nov. 4, 2022, Pending, Recovering Quarantined Information From Backup Locations.
U.S. Appl. No. 17/980,930, filed Nov. 4, 2022, Pending, Bulk Snapshot Recovery.
PCT/US22/79400, Nov. 7, 2022, Pending, Snapshot-Based Malware Maangement.
ISA/EP, Int'l App. No. PCT/US2022/079400, Partial International Search Report and Provisional Opinion dated Mar. 7, 2023, 6 pages.
ISA/EP, Int'l App. No. PCT/US2022/079400, Search Report and Written Opinion dated Mar. 7, 2023, 9 pages.

* cited by examiner

RECOVERING INFECTED SNAPSHOTS IN A SNAPSHOT CHAIN

CROSS REFERENCE

The Present Application for Patent claims the benefit of U.S. Provisional Application No. 63/421,536 by Chandra et al., entitled "BULK SNAPSHOT RECOVERY" and filed Nov. 1, 2022; U.S. Provisional Application No. 63/319,953 by Chandra et al., entitled "QUARANTINING INFORMATION IN BACKUP LOCATIONS" and filed Mar. 15, 2022; and U.S. Provisional Application No. 63/276,822 by Gee et al., entitled "MALWARE DETECTION IN SNAPSHOTS" and filed Nov. 8, 2021, each of which is assigned to the assignee hereof and expressly incorporated by reference herein.

TECHNICAL FIELD

The present disclosure relates generally to data management including techniques for recovering infected snapshots in a snapshot chain.

BACKGROUND

The volume and complexity of data that is collected, analyzed, and stored is increasing rapidly over time. The computer infrastructure used to handle this data is also becoming more complex, with more processing power and more portability. As a result, data management and storage is becoming increasingly important. Significant issues of these processes include access to reliable data backup and storage, and fast data recovery in cases of failure. Other aspects include data portability across locations and platforms.

DETAILED DESCRIPTION

Figure 1:
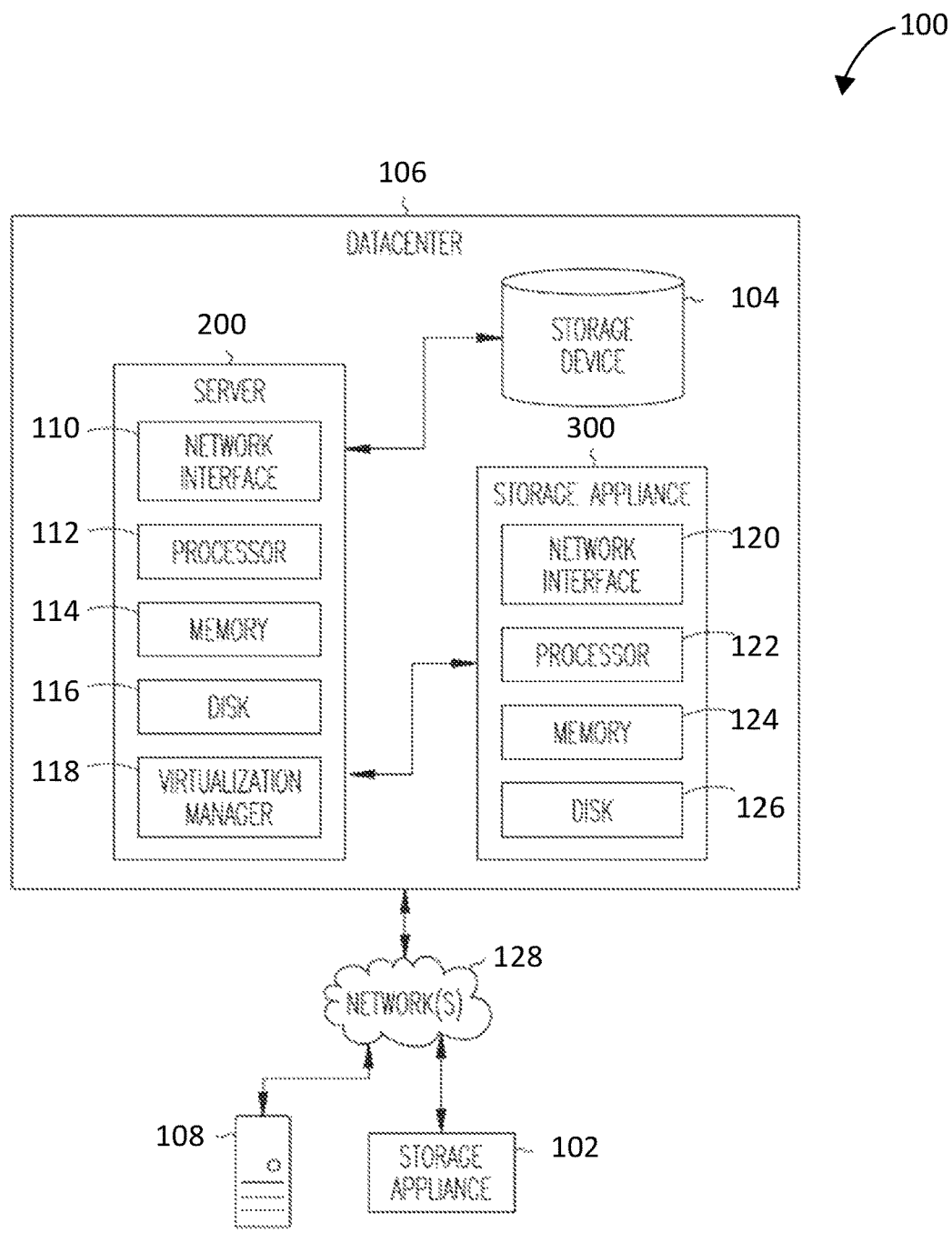
FIG. 1 depicts one embodiment of a networked computing environment in which the disclosed technology may be practiced, according to an example embodiment.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present inventive subject matter may be practiced without these specific details.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright It will be appreciated that some of the examples disclosed herein are described in the context of virtual machines that are backed up by using base and incremental snapshots, for example. This should not necessarily be regarded as limiting of the disclosures. The disclosures, systems and methods described herein apply not only to virtual machines of all types that run a file system (for example), but also to NAS devices, physical machines (for example Linux servers), and databases.

FIG. 1 depicts one embodiment of a networked computing environment 100 in which the disclosed technology may be practiced. As depicted, the networked computing environment 100 includes a data center 106, a storage appliance 102, and a computing device 108 in communication with each other via one or more networks 128. The networked computing environment 100 may also include a plurality of computing devices interconnected through one or more networks 128. The one or more networks 128 may allow computing devices and/or storage devices to connect to and communicate with other computing devices and/or other storage devices. In some cases, the networked computing environment 100 may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 106 may include one or more servers, such as server 200, in communication with one or more storage devices, such as storage device 104. The one or more servers may also be in communication with one or more storage appliances, such as storage appliance 102. The server 200, storage device 104, and storage appliance 300 may be in communication with each other via a networking fabric connecting servers and data storage units within the data center 106 to each other. The storage appliance 300 may include a data management system for backing up virtual machines and/or files within a virtualized infrastructure. The server 200 may be used to create and manage one or more virtual machines associated with a virtualized infrastructure.

The one or more virtual machines may run various applications, such as a database application or a web server. The storage device 104 may include one or more hardware storage devices for storing data, such as a hard disk drive (HDD), a magnetic tape drive, a solid-state drive (SSD), a storage area network (SAN) storage device, or a Networked-Attached Storage (NAS) device. In some cases, a data center, such as data center 106, may include thousands of servers and/or data storage devices in communication with each other. The one or more data storage devices 104 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 128 may include a secure network such as an enterprise private network, an unsecure network such as a wireless open network, a local area network (LAN), a wide area network (WAN), and the Internet. The one or more networks 128 may include a cellular network, a mobile network, a wireless network, or a wired network. Each network of the one or more networks 128 may include hubs, bridges, routers, switches, and wired transmission media such as a direct-wired connection. The one or more networks 128 may include an extranet or other private network for securely sharing information or providing controlled access to applications or files.

A server, such as server 200, may allow a client to download information or files (e.g., executable, text, application, audio, image, or video files) from the server 200 or to perform a search query related to particular information stored on the server 200. In some cases, a server may act as an application server or a file server. In general, server 200 may refer to a hardware device that acts as the host in a client-server relationship or a software process that shares a resource with or performs work for one or more clients.

One embodiment of server 200 includes a network interface 110, processor 112, memory 114, disk 116, and virtualization manager 118 all in communication with each other. Network interface 110 allows server 200 to connect to one or more networks 128. Network interface 110 may include a wireless network interface and/or a wired network interface. Processor 112 allows server 200 to execute computer-readable instructions stored in memory 114 in order to perform processes described herein. Processor 112 may include one or more processing units, such as one or more CPUs and/or one or more GPUs. Memory 114 may comprise one or more types of memory (e.g., RAM, SRAM, DRAM, ROM, EEPROM, Flash, etc.). Disk 116 may include a hard disk drive and/or a solid-state drive. Memory 114 and disk 116 may comprise hardware storage devices.

The virtualization manager 118 may manage a virtualized infrastructure and perform management operations associated with the virtualized infrastructure. The virtualization manager 118 may manage the provisioning of virtual machines running within the virtualized infrastructure and provide an interface to computing devices interacting with the virtualized infrastructure. In one example, the virtualization manager 118 may set a virtual machine having a virtual disk into a frozen state in response to a snapshot request made via an application programming interface (API) by a storage appliance, such as storage appliance 300. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 118 may then transfer data associated with the virtual machine (e.g., an image of the virtual machine or a portion of the image of the virtual disk file associated with the state of the virtual disk at the point in time it is frozen) to a storage appliance (for example, a storage appliance 102 or storage appliance 300 of FIG. 1, described further below) in response to a request made by the storage appliance. After the data associated with the point in time snapshot of the virtual machine has been transferred to the storage appliance 300 (for example), the virtual machine may be released from the frozen state (i.e., unfrozen) and the updates made to the virtual machine and stored in the separate file may be merged into the virtual disk file. The virtualization manager 118 may perform various virtual machine-related tasks, such as cloning virtual machines, creating new virtual machines, monitoring the state of virtual machines, moving virtual machines between physical hosts for load balancing purposes, and facilitating backups of virtual machines.

One embodiment of a storage appliance 300 (or storage appliance 102) includes a network interface 120, processor 122, memory 124, and disk 126 all in communication with each other. Network interface 120 allows storage appliance 300 to connect to one or more networks 128. Network interface 120 may include a wireless network interface and/or a wired network interface. Processor 122 allows storage appliance 300 to execute computer readable instructions stored in memory 124 in order to perform processes described herein. Processor 122 may include one or more processing units, such as one or more CPUs and/or one or more GPUs. Memory 124 may comprise one or more types of memory (e.g., RAM, SRAM, DRAM, ROM, EEPROM, NOR Flash, NAND Flash, etc.). Disk 126 may include a hard disk drive and/or a solid-state drive. Memory 124 and disk 126 may comprise hardware storage devices.

In one embodiment, the storage appliance 300 may include four machines. Each of the four machines may include a multi-core CPU, 64 GB of RAM, a 400 GB SSD, three 4 TB HDDs, and a network interface controller. In this case, the four machines may be in communication with the one or more networks 128 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 108. The storage appliance 102 may comprise a cloud-based data management system for backing up virtual machines and/or files within a virtualized infrastructure, such as virtual machines running on server 200/or files stored on server 200.

In some cases, networked computing environment 100 may provide remote access to secure applications and files stored within data center 106 from a remote computing device, such as computing device 108. The data center 106 may use an access control application to manage remote access to protected resources, such as protected applications, databases, or files located within the data center 106. To facilitate remote access to secure applications and files, a secure network connection may be established using a virtual private network (VPN). A VPN connection may allow a remote computing device, such as computing device 108, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 300 may manage the extraction and storage of virtual machine snapshots associated with different point in time versions of one or more virtual machines running within the data center 106. A snapshot of a virtual machine may correspond with a state of the virtual machine at a particular point-in-time. In response to a restore command from the storage device 104, the storage appliance 300 may restore a point-in-time version of a virtual machine or restore point-in-time versions of one or more files located on the virtual machine and transmit the restored data to the server 200. In response to a mount command from the server 200, the storage appliance 300 may allow a point-in-time version of a virtual machine to be mounted and allow the server 200 to read and/or modify data associated with the point-in-time version of the virtual machine. To improve storage density, the storage appliance 300 may deduplicate and compress data associated with different versions of a virtual machine and/or deduplicate and compress data associated with different virtual machines. To improve system performance, the storage appliance 300 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 300 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 300 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 300 may run an NFS server and make the particular version (or a copy of the particular version) of the virtual machine accessible for reading and/or writing. The end user of the storage appliance 300 may then select the particular version to be mounted and run an application (e.g., a data analytics application) using the mounted version of the virtual machine. In another example, the particular version may be mounted as an iSCSI target.

Figure 2:
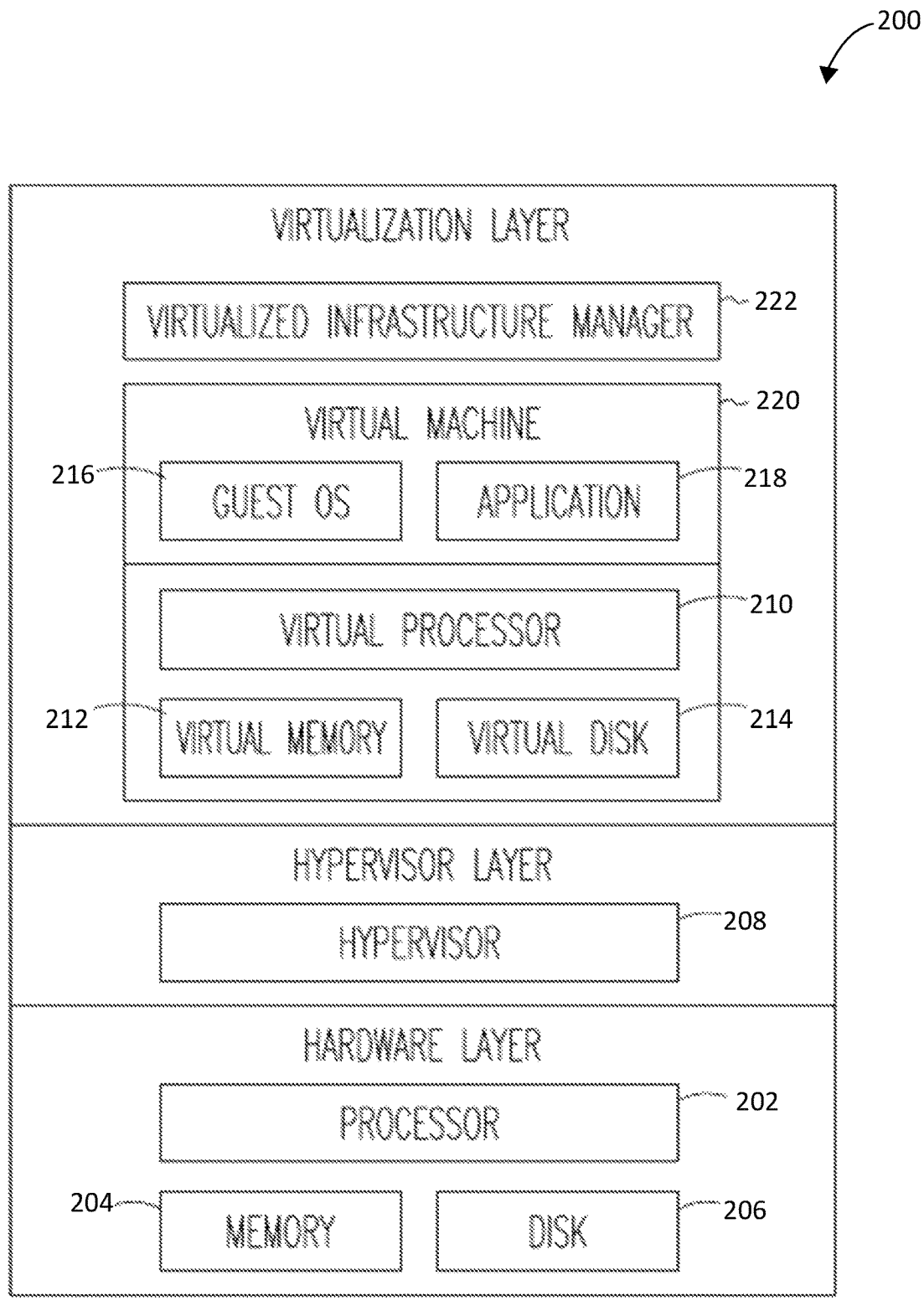
FIG. 2 depicts one embodiment of the server of FIG. 1, according to an example embodiment.

FIG. 2 depicts one embodiment of server 200 of FIG. 1. The server 200 may comprise one server out of a plurality of servers that are networked together within a data center (e.g., data center 106). In one example, the plurality of servers may be positioned within one or more server racks within the data center. As depicted, the server 200 includes hardware-level components and software-level components. The hardware-level components include one or more processors 202, one or more memory 204, and one or more disks 206. The software-level components include a hypervisor 208, a virtualized infrastructure manager 222, and one or more virtual machines, such as virtual machine 220. The hypervisor 208 may comprise a native hypervisor or a hosted hypervisor. The hypervisor 208 may provide a virtual operating platform for running one or more virtual machines, such as virtual machine 220. Virtual machine 220 includes a plurality of virtual hardware devices including a virtual processor 210, a virtual memory 212, and a virtual disk 214. The virtual disk 214 may comprise a file stored within the one or more disks 206. In one example, a virtual machine 220 may include a plurality of virtual disks 214, with each virtual disk of the plurality of virtual disks 214 associated with a different file stored on the one or more disks 206. Virtual machine 220 may include a guest operating system 216 that runs one or more applications, such as application 218.

The virtualized infrastructure manager 222, which may correspond with the virtualization manager 118 in FIG. 1, may run on a virtual machine or natively on the server 200. The virtual machine may, for example, be or include the virtual machine 220 or a virtual machine separate from the server 200. Other arrangements are possible. The virtualized infrastructure manager 222 may provide a centralized platform for managing a virtualized infrastructure that includes a plurality of virtual machines. The virtualized infrastructure manager 222 may manage the provisioning of virtual machines running within the virtualized infrastructure and provide an interface to computing devices interacting with the virtualized infrastructure. The virtualized infrastructure manager 222 may perform various virtualized infrastructure related tasks, such as cloning virtual machines, creating new virtual machines, monitoring the state of virtual machines, and facilitating backups of virtual machines.

In one embodiment, the server 200 may use the virtualized infrastructure manager 222 to facilitate backups for a plurality of virtual machines (e.g., eight different virtual machines) running on the server 200. Each virtual machine running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 102 in FIG. 1 or storage appliance 300 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 222 may set the virtual machine into a frozen state or store a copy of the virtual machine at the particular point in time. The virtualized infrastructure manager 222 may then transfer data associated with the virtual machine (e.g., an image of the virtual machine or a portion of the image of the virtual machine) to the storage appliance 300 or storage appliance 102. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 222 may transfer a full image of the virtual machine to the storage appliance 102 or storage appliance 300 of FIG. 1 or a plurality of data blocks corresponding with the full image (e.g., to enable a full image-level backup of the virtual machine to be stored on the storage appliance).

In other cases, the virtualized infrastructure manager 222 may transfer a portion of an image of the virtual machine associated with data that has changed since an earlier point in time prior to the particular point in time or since a last snapshot of the virtual machine was taken. In one example, the virtualized infrastructure manager 222 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 222 may output one or more virtual data blocks associated with the virtual machine that have been modified between the first point in time and the second point in time.

In some embodiments, the server 200 or the hypervisor 208 may communicate with a storage appliance, such as storage appliance 102 in FIG. 1 or storage appliance 300 in FIG. 1, using a distributed file system protocol such as Network File System (NFS) Version 3, or Server Message Block (SMB) protocol. The distributed file system protocol may allow the server 200 or the hypervisor 208 to access, read, write, or modify files stored on the storage appliance as if the files were locally stored on the server 200. The distributed file system protocol may allow the server 200 or the hypervisor 208 to mount a directory or a portion of a file system located within the storage appliance.

Figure 3:
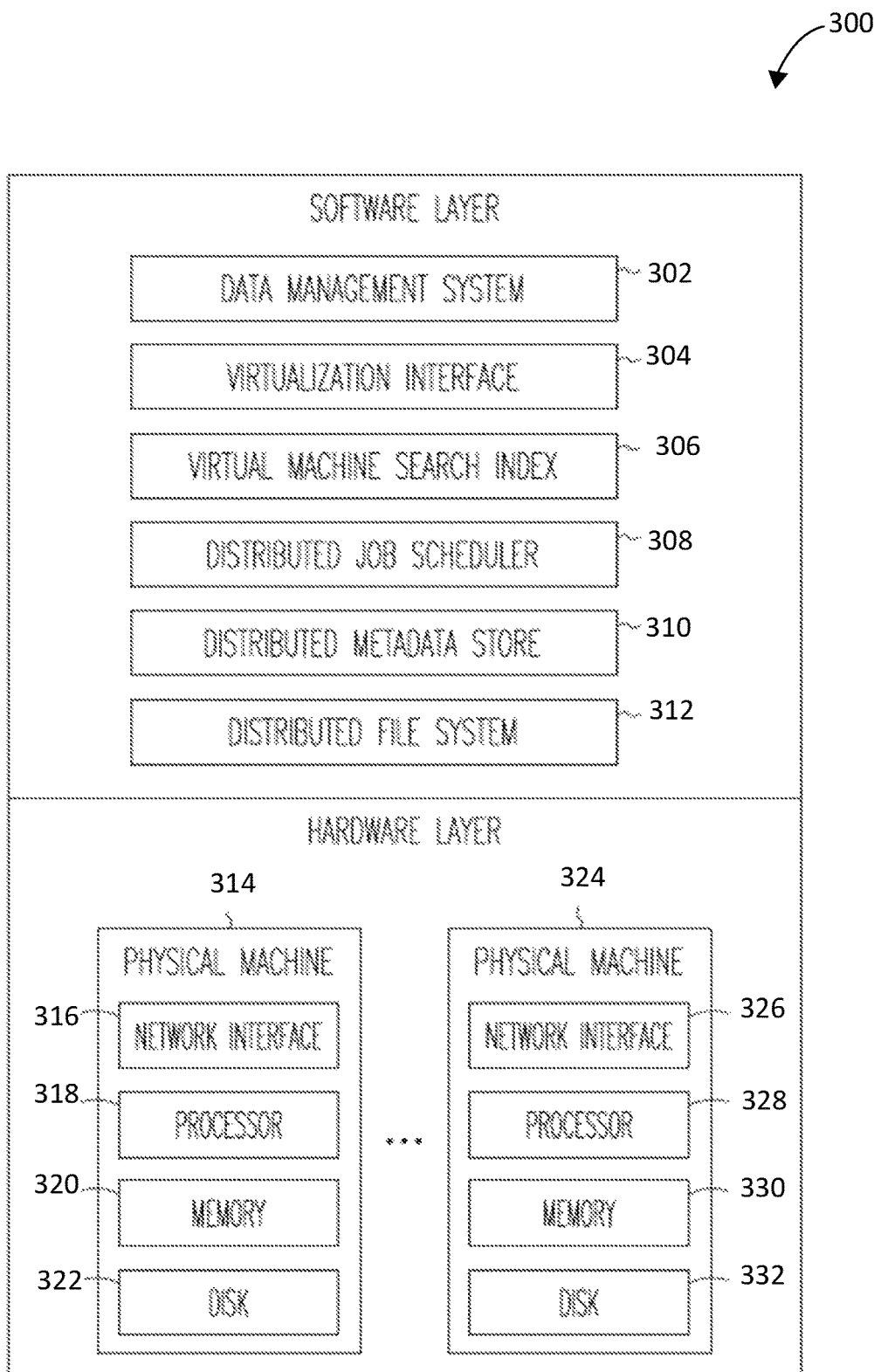
FIG. 3 depicts one embodiment of the storage appliance of FIG. 1, according to an example embodiment.

FIG. 3 depicts one embodiment of storage appliance 300 in FIG. 1. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 300 includes hardware-level components and software-level components. The hardware-level components include one or more physical machines, such as physical machine 314 and physical machine 324. The physical machine 314 includes a network interface 316, processor 318, memory 320, and disk 322 all in communication with each other. Processor 318 allows physical machine 314 to execute computer readable instructions stored in memory 320 to perform processes described herein. Disk 322 may include a hard disk drive and/or a solid-state drive. The physical machine 324 includes a network interface 326, processor 328, memory 330, and disk 332 all in communication with each other. Processor 328 allows physical machine 324 to execute computer readable instructions stored in memory 330 to perform processes described herein. Disk 332 may include a hard disk drive and/or a solid-state drive. In some cases, disk 332 may include a flash-based SSD or a hybrid HDD/SSD drive. In one embodiment, the storage appliance 300 may include a plurality of physical machines arranged in a cluster (e.g., eight machines in a cluster). Each of the plurality of physical machines may include a plurality of multi-core CPUs, 108 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 200 in FIG. 1, or a hypervisor, such as hypervisor 208 in FIG. 2, to communicate with the storage appliance 300 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 208 in FIG. 2, may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of nodeG) may be G-i) modulo N. In another example, given a number (N) of nodes in a cluster from node(0) to node(N−1), for a floating IP address (i), the VRRP priority of nodeG) may be (i-j) modulo N. In these cases, nodeG) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 302, a virtualization interface 304, a distributed job scheduler 308, a distributed metadata store 310, a distributed file system 312, and one or more virtual machine search indexes, such as virtual machine search index 306. In one embodiment, the software-level components of the storage appliance 300 may be run using a dedicated hardware-based appliance. In another embodiment, the software-level components of the storage appliance 300 may be run from the cloud (e.g., the software-level components may be installed on a cloud service provider).

In some cases, the data storage across a plurality of nodes in a cluster (e.g., the data storage available from the one or more physical machine (e.g., physical machine 314 and physical machine 324)) may be aggregated and made available over a single file system namespace (e.g., /snapshots/). A directory for each virtual machine protected using the storage appliance 300 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 312 may present itself as a single file system, in which as new physical machines or nodes are added to the storage appliance 300, the cluster may automatically discover the additional nodes and automatically increase the available capacity of the file system for storing files and other data. Each file stored in the distributed file system 312 may be partitioned into one or more chunks or shards. Each of the one or more chunks may be stored within the distributed file system 312 as a separate file. The files stored within the distributed file system 312 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1.s1.full) may be replicated and stored on three of the ten machines.

The distributed metadata store 310 may include a distributed database management system that provides high availability without a single point of failure. In one embodiment, the distributed metadata store 310 may comprise a database, such as a distributed document-oriented database. The distributed metadata store 310 may be used as a distributed key value storage system. In one example, the distributed metadata store 310 may comprise a distributed NoSQL key value store database. In some cases, the distributed metadata store 310 may include a partitioned row store, in which rows are organized into tables or other collections of related data held within a structured format within the key value store database. A table (or a set of tables) may be used to store metadata information associated with one or more files stored within the distributed file system 312. The metadata information may include the name of a file, a size of the file, file permissions associated with the file, when the file was last modified, and file mapping information associated with an identification of the location of the file stored within a cluster of physical machines.

In one embodiment, a new file corresponding with a snapshot of a virtual machine may be stored within the distributed file system 312 and metadata associated with the new file may be stored within the distributed metadata store 310. The distributed metadata store 310 may also be used to store a backup schedule for the virtual machine and a list of snapshots for the virtual machine that are stored using the storage appliance 300. In some examples, the metadata for a snapshot may include a time when the snapshot was taken, an expiration time for the snapshot, a quarantine status of the snapshot, and anomalous status of the snapshot (e.g., if malware is identified in the snapshot during ingestion, etc.).

In some cases, the distributed metadata store 310 may be used to manage one or more versions of a virtual machine. Each version of the virtual machine may correspond with a full image snapshot of the virtual machine stored within the distributed file system 312 or an incremental snapshot of the virtual machine (e.g., a forward incremental or reverse incremental) stored within the distributed file system 312. In one embodiment, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., an HDD) and the one or more incremental aspects derived from the single full image snapshot may be stored using a second storage device of a second type (e.g., an SSD). In this case, only a single full image needs to be stored and each version of the virtual machine may be generated from the single full image or the single full image combined with a subset of the one or more incremental aspects. Furthermore, each version of the virtual machine may be generated by performing a sequential read from the first storage device (e.g., reading a single file from an HDD) to acquire the full image and, in parallel, performing one or more reads from the second storage device (e.g., performing fast random reads from an SSD) to acquire the one or more incremental aspects.

The distributed job scheduler 308 may be used for scheduling backup jobs that acquire and store virtual machine snapshots for one or more virtual machines over time. The distributed job scheduler 308 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 308 may schedule a specific job to be run on a particular node based on data stored on the particular node. For example, the distributed job scheduler 308 may schedule a virtual machine snapshot job to be run on a node in a cluster that is used to store snapshots of the virtual machine in order to reduce network congestion.

The distributed job scheduler 308 may comprise a distributed fault tolerant job scheduler, in which jobs affected by node failures are recovered and rescheduled to be run on available nodes. In one embodiment, the distributed job scheduler 308 may be fully decentralized and implemented without the existence of a master node. The distributed job scheduler 308 may run job scheduling processes on each node in a cluster or on a plurality of nodes in the cluster. In one example, the distributed job scheduler 308 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 310. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 308 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 308 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks was ever performed. The series of tasks may correspond with an ordering of tasks for the series of tasks and the distributed job scheduler 308 may ensure that each task of the series of tasks is executed based on the ordering of tasks. Tasks that do not have dependencies with each other may be executed in parallel.

In some cases, the distributed job scheduler 308 may schedule each task of a series of tasks to be performed on a specific node in a cluster. In other cases, the distributed job scheduler 308 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 308 may assign one or more tasks associated with a job to be executed on a particular node in a cluster based on the location of data required to be accessed by the one or more tasks.

In one embodiment, the distributed job scheduler 308 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 222 in FIG. 2, to create a frozen copy of the virtual machine and to transfer one or more chunks (or one or more files) associated with the frozen copy to a storage appliance, such as storage appliance 300 in FIG. 1. The one or more tasks may also include generating metadata for the one or more chunks, storing the metadata using the distributed metadata store 310, storing the one or more chunks within the distributed file system 312, and communicating with the virtualized infrastructure manager 222 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 92 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 304 may provide an interface for communicating with a virtualized infrastructure manager managing a virtualization infrastructure, such as virtualized infrastructure manager 222 in FIG. 2, and requesting data associated with virtual machine snapshots from the virtualization infrastructure. The virtualization interface 304 may communicate with the virtualized infrastructure manager using an Application Programming Interface (API) for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 304 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 306 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 306 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 312 in FIG. 3.

The data management system 302 may comprise an application running on the storage appliance 300 that manages and stores one or more snapshots of a virtual machine. In one example, the data management system 302 may comprise a highest-level layer in an integrated software stack running on the storage appliance. The integrated software stack may include the data management system 302, the virtualization interface 304, the distributed job scheduler 308, the distributed metadata store 310, and the distributed file system 312.

In some cases, the integrated software stack may run on other computing devices, such as a server or computing device 108 in FIG. 1. The data management system 302 may use the virtualization interface 304, the distributed job scheduler 308, the distributed metadata store 310, and the distributed file system 312 to manage and store one or more snapshots of a virtual machine. Each snapshot of the virtual machine may correspond with a point-in-time version of the virtual machine. The data management system 302 may generate and manage a list of versions for the virtual machine. Each version of the virtual machine may map to or reference one or more chunks and/or one or more files stored within the distributed file system 312. Combined together, the one or more chunks and/or the one or more files stored within the distributed file system 312 may comprise a full image of the version of the virtual machine.

Figure 4:
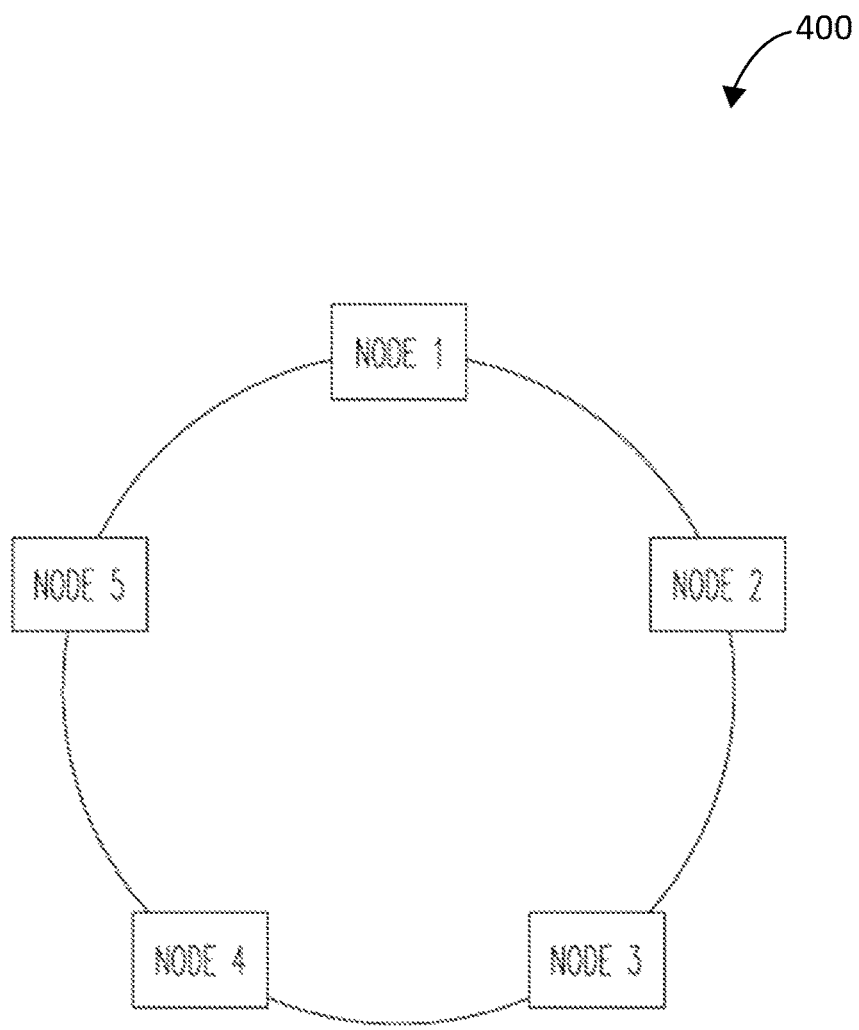
FIG. 4 shows an example cluster of a distributed decentralized database, according to some example embodiments.

FIG. 4 shows an example cluster 400 of a distributed decentralized database, according to some example embodiments. As illustrated, the example cluster 400 includes five nodes, nodes 1-5. In some example embodiments, each of the five nodes runs from different machines, such as physical machine 314 in FIG. 3 or virtual machine 220 in FIG. 2. The nodes in the example cluster 400 can include instances of peer nodes of a distributed database (e.g., cluster-based database, distributed decentralized database management system, a NoSQL database, Apache Cassandra, DataStax, MongoDB, CouchDB), according to some example embodiments. The distributed database system is distributed in that data is sharded or distributed across the example cluster 400 in shards or chunks and decentralized in that there is no central storage device and no single point of failure. The system operates under an assumption that multiple nodes may go down, up, or become non-responsive, and so on. Sharding is splitting up of the data horizontally and managing each shard separately on different nodes. For example, if the data managed by the example cluster 400 can be indexed using the 26 letters of the alphabet, node 1 can manage a first shard that handles records that start with A through E, node 2 can manage a second shard that handles records that start with F through J, and so on.

In some example embodiments, data written to one of the nodes is replicated to one or more other nodes per a replication protocol of the example cluster 400. For example, data written to node 1 can be replicated to nodes 2 and 3. If node 1 prematurely terminates, node 2 and/or 3 can be used to provide the replicated data. In some example embodiments, each node of example cluster 400 frequently exchanges state information about itself and other nodes across the example cluster 400 using gossip protocol. Gossip protocol is a peer-to-peer communication protocol in which each node randomly shares (e.g., communicates, requests, transmits) location and state information about the other nodes in a given cluster.

Writing: For a given node, a sequentially written commit log captures the write activity to ensure data durability. The data is then written to an in-memory structure (e.g., a memtable, write-back cache). Each time the in-memory structure is full, the data is written to disk in a Sorted String Table data file. In some example embodiments, writes are automatically partitioned and replicated throughout the example cluster 400.

Reading: Any node of example cluster 400 can receive a read request (e.g., query) from an external client. If the node that receives the read request manages the data requested, the node provides the requested data. If the node does not manage the data, the node determines which node manages the requested data. The node that received the read request then acts as a proxy between the requesting entity and the node that manages the data (e.g., the node that manages the data sends the data to the proxy node, which then provides the data to an external entity that generated the request).

The distributed decentralized database system is decentralized in that there is no single point of failure due to the nodes being symmetrical and seamlessly replaceable. For example, whereas conventional distributed data implementations have nodes with different functions (e.g., master/slave nodes, asymmetrical database nodes, federated databases), the nodes of example cluster 400 are configured to function the same way (e.g., as symmetrical peer database nodes that communicate via gossip protocol, such as Cassandra nodes) with no single point of failure. If one of the nodes in example cluster 400 terminates prematurely ("goes down"), another node can rapidly take the place of the terminated node without disrupting service. The example cluster 400 can be a container for a keyspace, which is a container for data in the distributed decentralized database system (e.g., whereas a database is a container for containers in conventional relational databases, the Cassandra keyspace is a container for a Cassandra database system).

Figure 5:
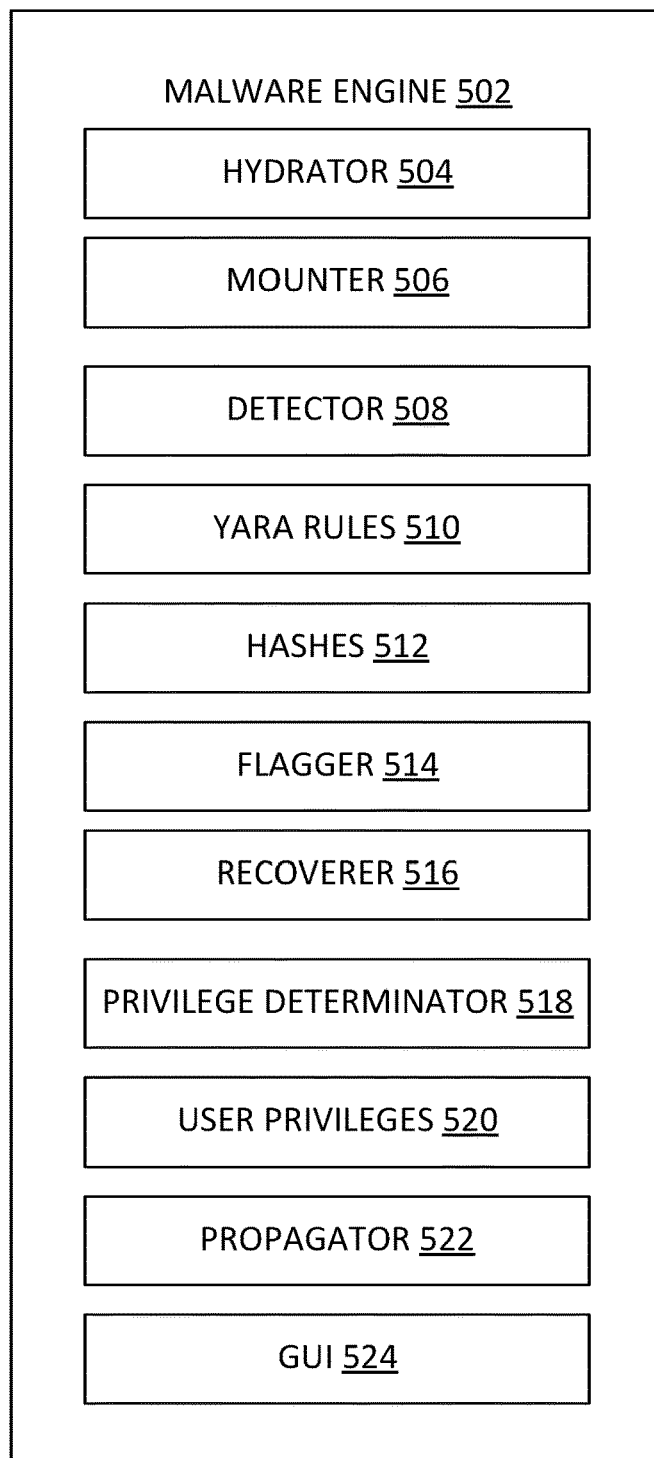
FIG. 5 depicts a block diagram of a malware engine according to an example embodiment.

FIG. 5 depicts a block diagram of a malware engine 502 according to an example embodiment. The malware engine 502 comprises a hydrator 504, a mounter 506, a detector 508, a Yet Another Recursive/Ridiculous Acronym YARA rules 510, hashes 512, a flagger 514, a recoverer 516, a privilege determinator 518, user privileges 520, a propagator 522, and a graphical user interface GUI 524.

As will be discussed in more detail below, the malware engine 502 detects indicators of compromise that is present on a snapshot of an object (e.g., virtual machine, database, file system, etc.) that shows the snapshot may have been compromised by malware, such as ransomware. Ransomware is a piece of malware which infects an enterprise and encrypts its data. Embodiments enable an enterprise to quickly recover all protected objects to a safe copy, bringing the business back online as soon as possible, cutting out the malware from IT infrastructure, and restoring the maximum amount of data possible.

In order to initiate a recovery, the malware engine 502 determines the most recent point in time snapshot for each object that was not infected and enables push-button recovery of the determined snapshot using the GUI 524. Specifically, a user can select an object or objects with the GUI 524 to scan snapshots in a snapshot chain of the object, e.g., starting with a most recent snapshot and scanning successively older snapshots (or skipping snapshots) in a snapshot chain (reverse chronological order or other order). Alternatively, a user can specify a range of snapshot to scan as well as specific objects, directories, etc. For each snapshot, the hydrator 504 will hydrate the snapshot (e.g., materialize/instantiate the snapshot e.g., via zero data copy) and the mounter 506 will mount (e.g., read without necessarily writing or transferring data as in a restore) the hydrated snapshot in a virtual machine (e.g., created by the hypervisor 208), which may be sandboxed (e.g., no or limited network access) via, for example, user-mode Linux. The detector 508 then scans the mounted snapshot using YARA rules 510 and/or hashes 512 for malware. YARA rules 510 are a domain-specific language by which intelligence about indicators of compromise can be written and shared for threat hunting purposes. They typically allow for the specification of text or binary based indicators.

The detector 508 can be set to scan for malware based on all or a subset of the hashes 512 and/or the YARA rules 510. For example, a query may be files with hashes A and B modified in the past month. Scanning may also be done by filename. After a snapshot is determined to be infected based on the presence of an indicator of compromise (e.g., matching hash and/or satisfied YARA rule), the GUI 524 can display an interface showing infected versus non-infected snapshots as in example interface 700. The detector 508 can be deployed so that it examines all objects in a system and displays results for all objects as shown in the example interface 700.

The recoverer 516 recovers (e.g., restores, reads, mounts, etc.) non-infected snapshots, and, subject to user privileges 520, can recover infected snapshots and content (files) for forensic analysis, e.g., to a sandboxed virtual machine. The recoverer 516 can also restore non-infected files on infected snapshots. The privilege determinator 518 optionally limits what snapshots or content can be restored based on the user privileges 520. For example, by default, only non-infected snapshots may be restored. However, per user privileges 520, infected snapshots may be restored if a specific user requesting the restore has high enough privileges.

The propagator 522 propagates an infected (quarantine) status for a snapshot or content therein to other locations where a snapshot may be, e.g., archives or replicas of the snapshot, so that the duplicate of the infected snapshot isn't accidentally restored, thereby spreading malware.

Figure 6:
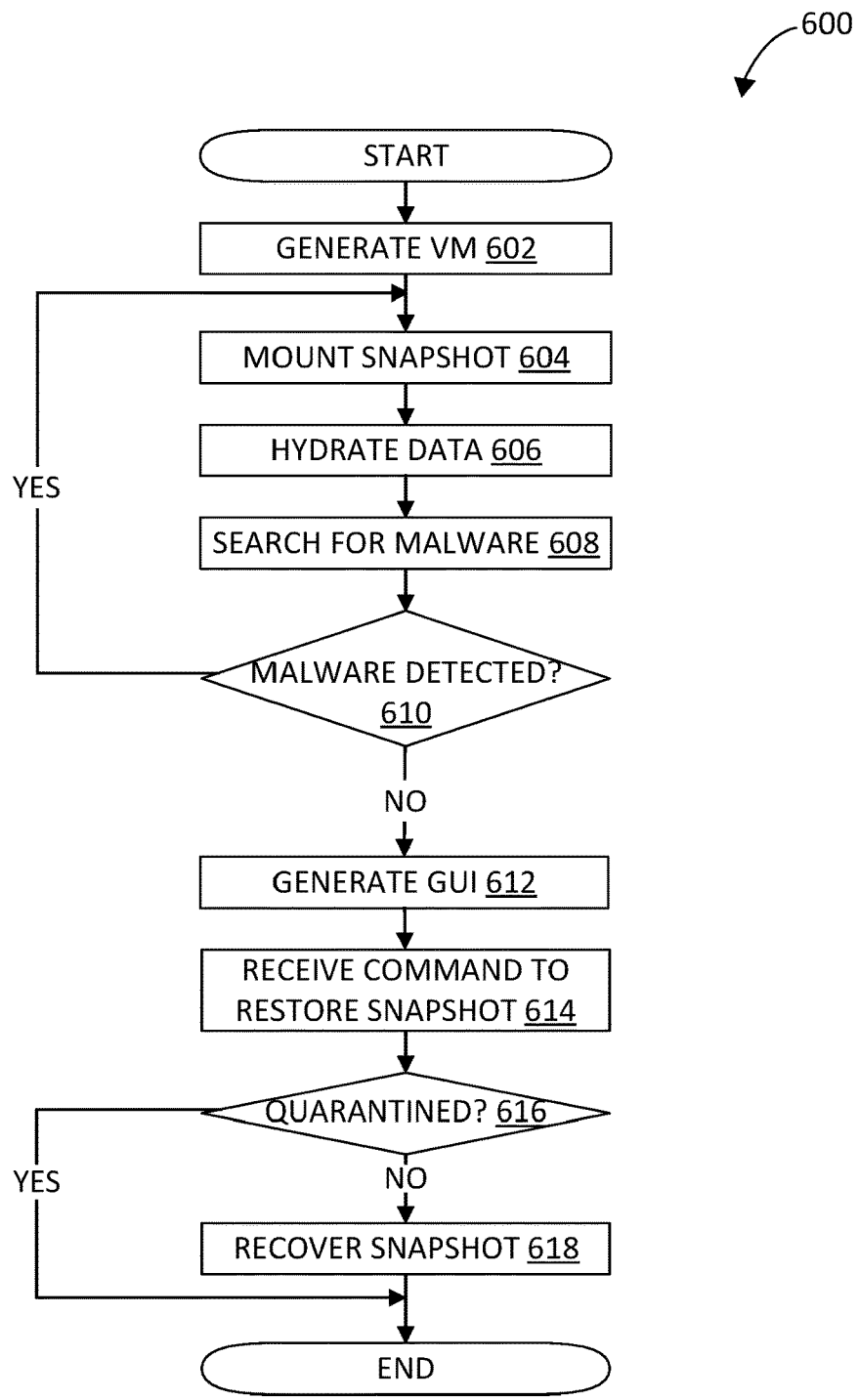
FIG. 6 depicts a flowchart illustrating a method of scanning a snapshot for malware according to an example embodiment.

FIG. 6 depicts a flowchart illustrating a method 600 of scanning a snapshot for malware according to an example embodiment. In an example embodiment, the storage appliance 300 can execute the method 600 using the malware engine 502. Example methods described herein may also be implemented in the form of executable instructions stored on a machine-readable medium or in the form of electronic circuitry. For instance, the operations of the method 600 may be represented by executable instructions that, when executed by a processor of a computing device, cause the computing device to perform the method 600. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 602, the hypervisor 208 generates a virtual machine, e.g., virtual machine 220, which can be sandboxed (e.g., no or limited network access to prevent the spread of malware to other parts of a network). A snapshot is then mounted at operation 604, e.g., with Rubrik's LIVE-MOUNT. The snapshot may be part of a snapshot chain and accordingly, a most recent snapshot may be mounted or a specific snapshot selected for mounting. A range of snapshots can be specified as well as, snapshots of objects and/or directories. Data within the snapshot is then hydrated with the hydrator 504 at operation 606, which can include materializing/instantiating the snapshot.

The detector 508 then searches the mounted hydrated snapshot for malware at operation 608. Searching can include applying YARA rules 510 and/or looking for matching hashes 512 (e.g., MD5, SHA1, and/or SHA256) and/or looking for specific file names (e.g., by name, such as ABAP/Rivpas.c.intd, and/or by path prefix) and/or path matches. The YARA rules 510 and/or hashes 512 may be imported (e.g., if new YARA rules 510 or hashes 512 are created) and the detector 508 can search for malware 608 using all or a subset of the YARA rules 510 and/or hashes 512.

For example, given a set of Indicators of Compromise encoded as YARA rules in a CISA alert (such as Alert (AA20-302A) Ransomware Activity Targeting the Healthcare and Public Health Sector), the detector 508 identifies any snapshots where those indicators were found. In some examples, the detector 508 identifies files associated with the indicators. Additionally, or alternatively, the detector 508 may receive a set of suspicious file hashes or file paths (such as from Microsoft's Hafnium IOC list) and may identify snapshots including the suspicious file hashes or file paths. In some examples, the detector 508 may analyze each file in a snapshot using one or more of: the YARA rules, suspicious file hashes, and suspicious file paths. Accordingly, the detector 508 may detect malware (e.g., infected files), maliciously encrypted data, or both. Additionally, or alternatively, the detector 508 may analyze sectors of a snapshot (including multiple files) or an entire snapshot using one or more of: the YARA rules, suspicious file hashes, and suspicious file paths.

Further, the detector 508 may restrict a search to specific snapshots or range of snapshots, a subset of files/directories and/or scan a replica of a snapshot instead an original snapshot. Restricting the search can include specific subsets of files or directories; file size limits, file creation/modification timestamps (e.g., before, after, or between timestamp(s)); file ownership; and files added/modified in a current snapshot (i.e., files that were not in prior snapshot or modified since that snapshot). Note that once a file in a snapshot is determined to be infected, it can be inferred that all later snapshots are infected (even if outside of a set range) and/or that specific file in the snapshot will be infected in later snapshots.

If, at operation 610, malware is detected, then a next most recent snapshot in the snapshot chain is mounted and the process is repeated until no malware is detected at operation 610. Further, in case of false negatives, additional snapshots in the chain can be scanned after no malware is detected in operation 610. Alternatively, the mounting 604 through the detecting 610 can start with an oldest or base snapshot and assuming no malware was detected in the base snapshot, repeating the process until malware is detected. Further, once malware is detected in a snapshot, the remainder of the snapshot does not need to be scanned and the next snapshot in the snapshot chain can be searched for malware.

Further, the mounting 604 through the detecting 610 can be repeated for all or some objects of a system including virtual machines, file systems, databases, network attached storage, etc. When malware is detected, metadata in the snapshot can be adjusted to indicate quarantine status. For example, quarantine-related metadata for the infected snapshots (e.g., quarantine status metadata, among other quarantine-related metadata) may be updated for the infected snapshot.

At operation 612, the GUI 524 generates an interface, such as example interface 700, as will be discussed in further detail in conjunction with FIG. 7. For each object, the example interface 700 can show snapshots over time with a status (e.g., color coded) of each snapshot (infected, not infected, encrypted, infected and partially encrypted). The example interface 700 may also illustrate a cut point above which snapshots are quarantined due to infection (e.g., not recoverable, recovery not permitted, recoverable with sufficient user privileges, partially recoverable, etc.). The GUI 524 may display object(s) scanned (VM, Host/Share/fileset, etc.); snapshot(s) scanned; Date/time of scan; scan filter criteria; Hash/Rules, etc. being scanned for (e.g., for YARA Rules: i. Rule name ii. Namespace iii. Tags iv. Hash of the rule, etc.); number of matched files; and number of matches; etc.

The GUI 524 may also provide detailed results after a search including: 1. The file name & path where a match was found 2. The rule (hash, or YARA name, namespace and tags) that were matched 3. The time when this file was created 4. The time when this file was modified 5. The owner of this file a. Their fully qualified name (if retrievable) b. Any security identifier (e.g., SID for Windows, User ID for Linux/Unix) 6. The MD5, SHA1, and SHA256 hashes of this file, etc.

A user then, using an interface such as the example interface 700, enters a command to recover a snapshot, which is received at operation 614. If the selected snapshot is determined to be quarantined at operation 616, then the method 600 ends. Else, the snapshot can be recovered by the recoverer 516 at operation 618, which can include mounting and/or restoring, etc. to a specified destination.

Accordingly, the method 600 enables users to recover data in infected system without compromising recovered systems. For example, the method 600 enables users to restore an object to a point prior to a malware infection by quickly identifying healthy snapshots that can be used to perform a full system restore. Further, as the method 600 quarantines infected snapshots, the method 600 prevents reinfection by malware.

Figure 7:
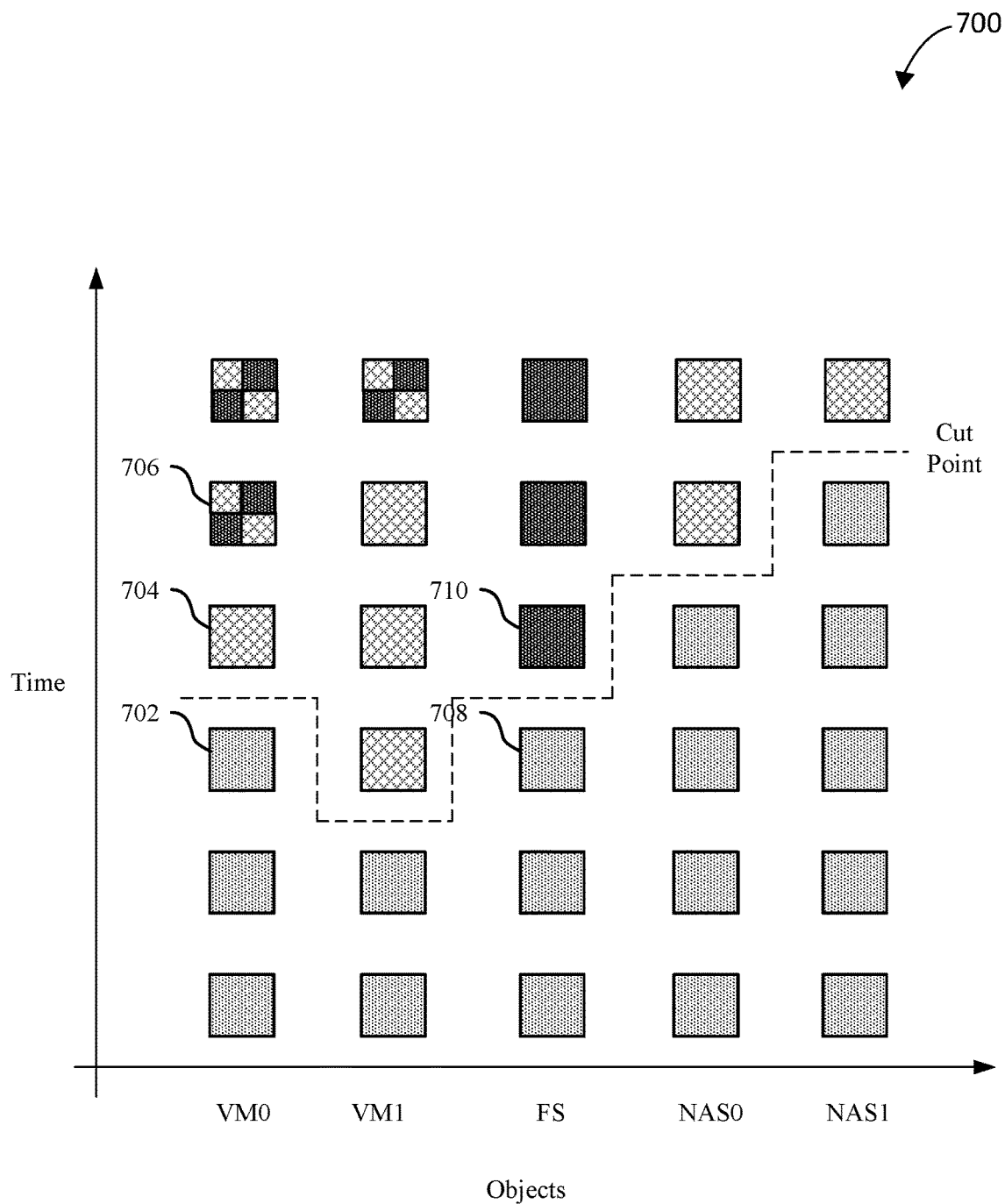
FIG. 7 depicts an example interface according to an example embodiment.

FIG. 7 depicts an example interface 700 according to an example embodiment. The GUI 524 generates the example interface 700 in one embodiment. The example interface 700 illustrates, for each object, a snapshot chain (e.g., in chronological order) and the status of each snapshot in each chain (or for the specified snapshots or range scanned). Further, the example interface 700 may illustrate a cut point indicating a quarantining of snapshots due to infection. For example, snapshots 702 and 708 are below the cut point and therefore not infected and can be restored and not quarantined. On the other hand, snapshot 704 is infected with malware while snapshot 706 is infected with malware and partially encrypted by that malware. On the other hand, snapshot 710 is fully encrypted by malware (which can be determined via entropy measurement).

Figure 8:
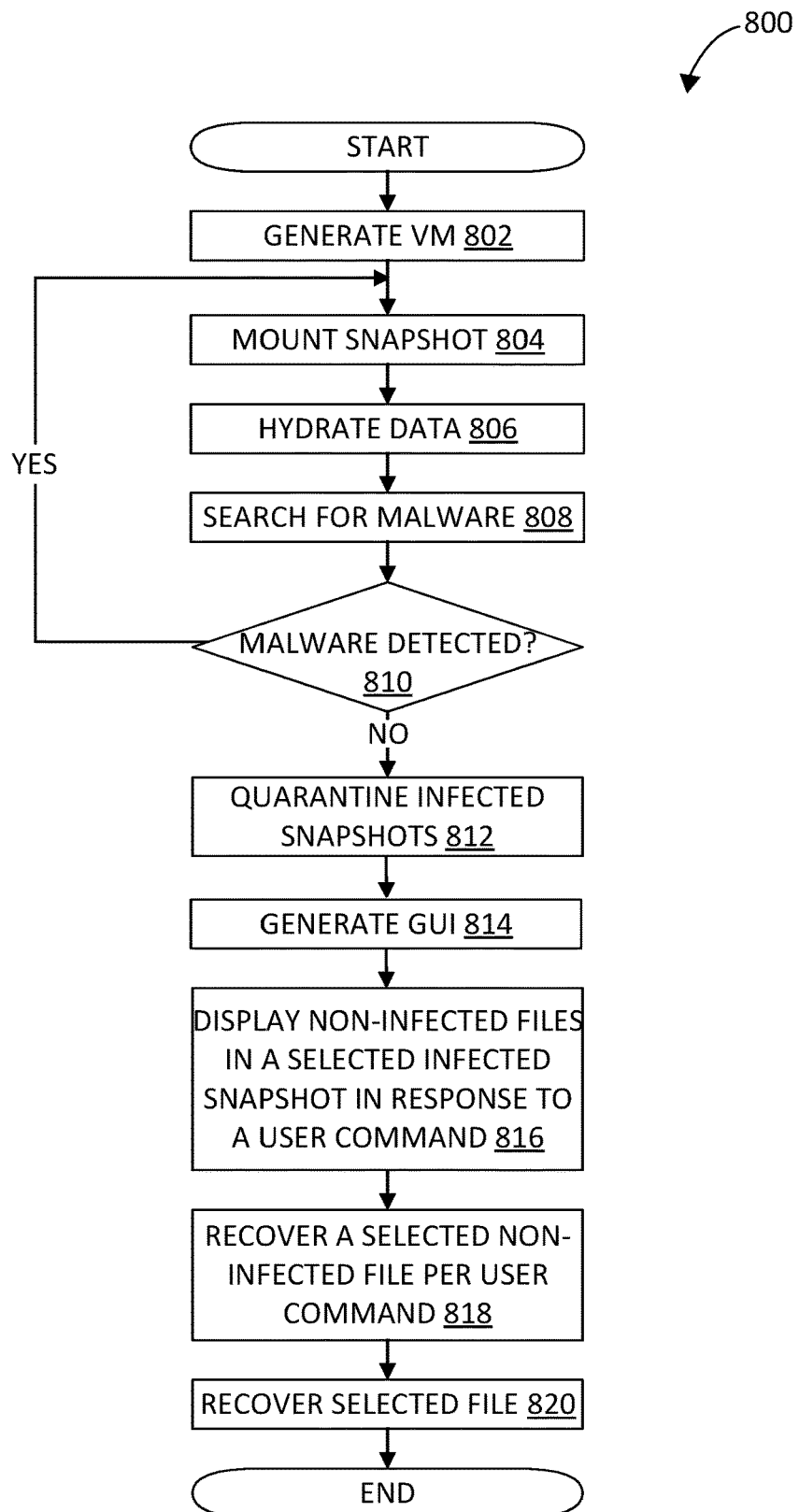
FIG. 8 depicts a flowchart illustrating a method of recovering a non-infected file in an infected snapshot according to an example embodiment.

FIG. 8 depicts a flowchart illustrating a method 800 of recovering a non-infected file in an infected snapshot according to an example embodiment. In an example embodiment, the storage appliance 300 can execute the method 800 using the malware engine 502. Example methods described herein may also be implemented in the form of executable instructions stored on a machine-readable medium or in the form of electronic circuitry. For instance, the operations of the method 800 may be represented by executable instructions that, when executed by a processor of a computing device, cause the computing device to perform the method 800. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 802, the hypervisor 208 generates a virtual machine, e.g., virtual machine 220, which can be sandboxed (e.g., no or minimal network access to prevent the spread of malware to other parts of a network). A snapshot is then mounted at operation 804, e.g., with Rubrik's LIVE-MOUNT. The snapshot may be part of a snapshot chain and accordingly, a most recent snapshot may be mounted or a specific snapshot selected for mounting. Data within the snapshot is then hydrated with the hydrator 504 at operation 806. The detector 508 then searches the mounted hydrated snapshot for malware at operation 808. Searching can include applying YARA rules 510 and/or looking for matching hashes 512 (e.g., MD5, SHA1, and/or SHA256) and/or looking for specific file names (e.g., by name, such as ABAP/Rivpas.c.intd, and/or by path prefix) and/or path matches. The YARA rules 510 and/or hashes 512 may be imported (e.g., if new YARA rules 510 or hashes 512 are created) and the detector 508 can search for malware 808 using all or a subset of the YARA rules 510 and/or the hashes 512.

For example, given a set of Indicators of Compromise encoded as YARA rules in a CISA alert (such as Alert (AA20-302A) Ransomware Activity Targeting the Healthcare and Public Health Sector), the detector 508 may identify any snapshots, file paths, or both, where those indicators were found. Or, given a set of suspicious file hashes or file paths (such as from Microsoft's Hafnium IOC list), the detector 508 may identify those snapshots, file paths, or both as well.

Further, the detector 508 may restrict a search to a range of snapshots, a subset of files/directories and/or scan a replica of a snapshot instead an original snapshot. Restricting the search can include specific snapshots or range of snapshots, specific subsets of files or directories; file size limits, file creation/modification timestamps (e.g., before, after between timestamp(s)); file ownership; and files added/ modified in a current snapshot (i.e., files that were not in prior snapshot or modified since that snapshot). Note that once a file in a snapshot is determined to be infected, it can be inferred that all later snapshots are infected (even if outside of a set range) and/or that specific file in the snapshot will be infected in later snapshots.

If, at operation 810, malware is detected, then a next most recent snapshot in the snapshot chain is mounted and the process is repeated until no malware is detected at operation 810. Further, in case of false negatives, additional snapshots in the chain can be scanned after no malware is detected in operation 810. Alternatively, the mounting 804 through the detecting 810 can start with an oldest or base snapshot and assuming no malware was detected in the base snapshot, repeating the process until malware is detected.

Further, the mounting 804 through the detecting 810 can be repeated for all objects of a system including virtual machines, file systems, databases, network attached storage, etc. When malware is detected, metadata in the snapshot can be adjusted to indicate quarantine status.

After the searching 808 is complete, the infected snapshots are quarantined at operation 812, e.g., by adjusting metadata of the infected snapshots (e.g., changing a bit in the metadata for a field that indicates infected, encrypted, etc.). For example, quarantine-related metadata for the infected snapshots (e.g., quarantine status metadata, among other quarantine-related metadata) may be updated for the infected snapshot.

At operation 814, the GUI 524 generates an interface, such as the example interface 700. For each object, the example interface 700 can show snapshots over time with a status (e.g., color coded) of each snapshot (infected, not infected, encrypted, infected and partially encrypted). The example interface 700 may also illustrate a cut point above which snapshots are quarantined (e.g., not recoverable, recovery not permitted, recoverable with sufficient user privileges, partially recoverable, etc.). The GUI 524 may display object(s) scanned (VM, Host/Share/fileset, etc.); snapshot(s) scanned; Date/time of scan; scan filter criteria; Hash/Rules, etc. being scanned for (e.g., for YARA Rules: i. Rule name ii. Namespace iii. Tags iv. Hash of the rule, etc.); number of matched files; and number of matches; etc.

The GUI 524 may also provide detailed results after a search including: 1. The file name & path where a match was found 2. The rule (hash, or YARA name, namespace and tags) that were matched 3. The time when this file was created 4. The time when this file was modified 5. The owner of this file a. Their fully qualified name (if retrievable) b. Any security identifier (e.g., SID for Windows, User ID for Linux/Unix) 6. The MD5, SHA1, and SHA256 hashes of this file, etc.

A user then selects an infected snapshot, and the GUI 524 displays a list of non-infected files in the infected snapshot at operation 816 as determined by the search for malware at operation 808. Per a user command, a selected non-infected file from the infected snapshot is then recovered (e.g., mounted, restored, viewed, etc.) at operation 820 with the recoverer 516. The method 800 then ends.

Figure 9:
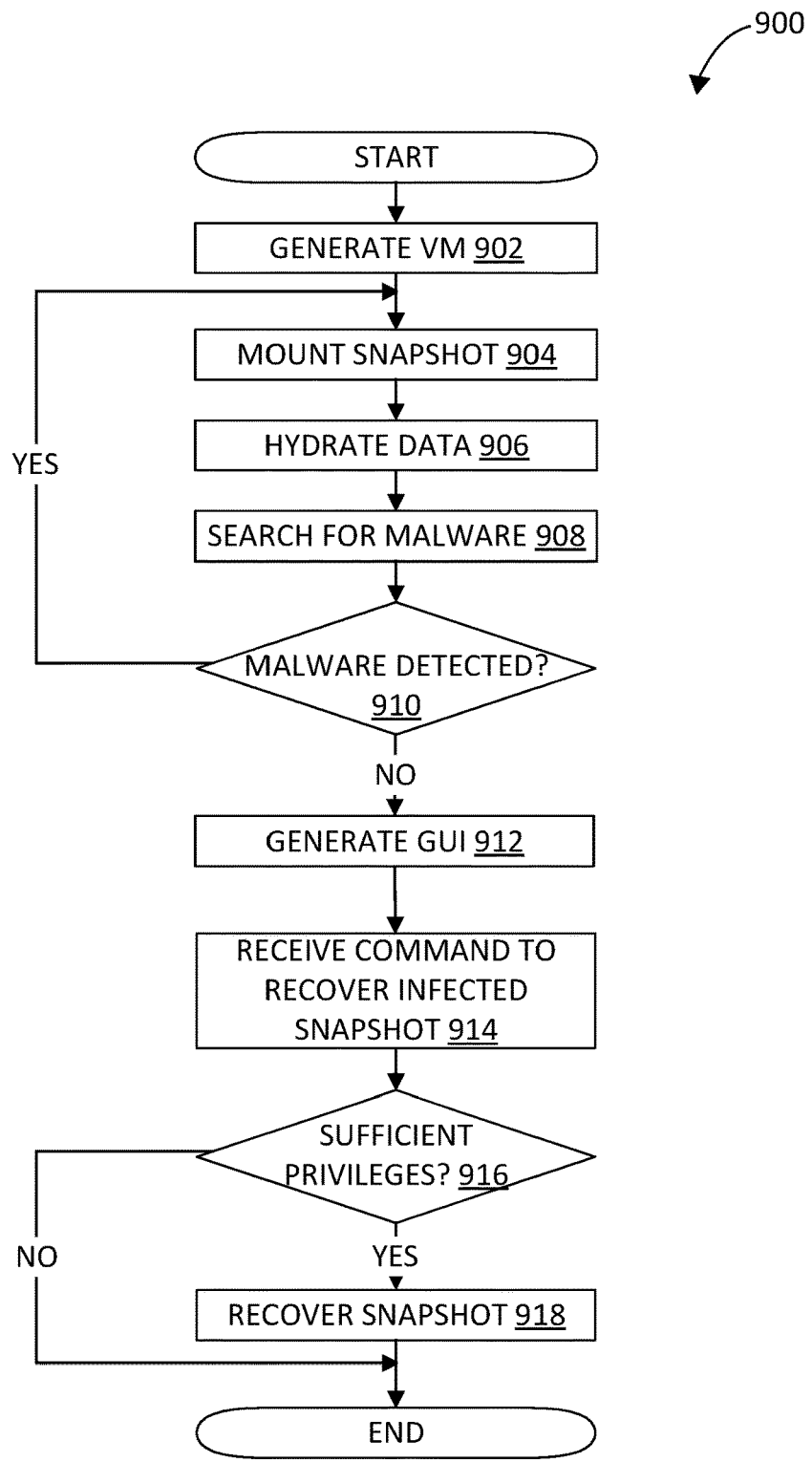
FIG. 9 depicts a flowchart illustrating a method of recovering an infected snapshot according to an example embodiment.

FIG. 9 depicts a flowchart illustrating a method 900 of recovering an infected snapshot according to an example embodiment. In an example embodiment, the storage appliance 300 can execute the method 900 using the malware engine 502. Example methods described herein may also be implemented in the form of executable instructions stored on a machine-readable medium or in the form of electronic circuitry. For instance, the operations of the method 900 may be represented by executable instructions that, when executed by a processor of a computing device, cause the computing device to perform the method 900. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 902, the hypervisor 208 generates a virtual machine, e.g., virtual machine 220, which can be sandboxed (e.g., no network access to prevent the spread of malware to other parts of a network). A snapshot is then mounted at operation 904, e.g., with Rubrik's LIVEMOUNT. The snapshot may be part of a snapshot chain and accordingly, a most recent snapshot may be mounted or a specific snapshot selected for mounting. Data within the snapshot is then hydrated with the hydrator 504 at operation 906. The detector 508 then searches the mounted hydrated snapshot for malware at operation 908. Searching can include applying YARA rules 510 and/or looking for matching hashes 512 (e.g., MD5, SHA1, and/or SHA256) and/or looking for specific file names (e.g., by name, such as ABAP/Rivpas-.c.intd, and/or by path prefix) and/or path matches. The YARA rules 510 and/or hashes 512 may be imported (e.g., if new YARA rules 510 or hashes 512 are created) and the detector 508 can search for malware 908 using all or a subset of the YARA rules 510 and/or hashes 512.

For example, given a set of Indicators of Compromise encoded as YARA rules in a CISA alert (such as Alert (AA20-302A) Ransomware Activity Targeting the Healthcare and Public Health Sector), the detector 508 may identify any snapshots, file paths, or both, where those indicators were found. Or, given a set of suspicious file hashes or file paths (such as from Microsoft's Hafnium IOC list), the detector 508 may identify those snapshots, file paths, or both as well.

Further, the detector 508 may restrict a search to a specific snapshots or range of snapshots, a subset of files/directories and/or scan a replica of a snapshot instead an original snapshot. Restricting the search can include specific subsets of files or directories; file size limits, file creation/modification timestamps (e.g., before, after between timestamp(s)); file ownership; and files added/modified in a current snapshot (i.e., files that were not in prior snapshot or modified since that snapshot).

If, at operation 910, malware is detected, then a next most recent snapshot in the snapshot chain is mounted and the process is repeated until no malware is detected at operation 910. Further, in case of false negatives, additional snapshots in the chain can be scanned after no malware is detected in operation 910. Alternatively, the mounting 904 through the detecting 910 can start with an oldest or base snapshot and assuming no malware was detected in the base snapshot, repeating the process until malware is detected. Further, once malware is detected in a snapshot, the remainder of the snapshot optionally does not need to be scanned and the next snapshot in the snapshot chain can be searched for malware.

Further, the mounting 904 through the detecting 910 can be repeated for all objects of a system including virtual machines, file systems, databases, network attached storage, etc. When malware is detected, metadata in the snapshot can be adjusted to indicate quarantine status. For example, quarantine-related metadata for the infected snapshots (e.g., quarantine status metadata, among other quarantine-related metadata) may be updated for the infected snapshot.

At operation 912, the GUI 524 generates an interface, such as the example interface 700. For each object, the example interface 700 can show snapshots over time with a status (e.g., color coded) of each snapshot (infected, not infected, encrypted, infected and partially encrypted). The example interface 700 may also illustrate a cut point above which snapshots are quarantined (e.g., not recoverable, recovery not permitted, recoverable with sufficient user privileges, partially recoverable, etc.). The GUI 524 may display object(s) scanned (VM, Host/Share/fileset, etc.); snapshot(s) scanned; Date/time of scan; scan filter criteria; Hash/Rules, etc. being scanned for (e.g., for YARA Rules: i. Rule name ii. Namespace iii. Tags iv. Hash of the rule, etc.); number of matched files; and number of matches; etc.

The GUI 524 may also provide detailed results after a search including: 1. The file name & path where a match was found 2. The rule (hash, or YARA name, namespace and tags) that were matched 3. The time when this file was created 4. The time when this file was modified 5. The owner of this file a. Their fully qualified name (if retrievable) b. Any security identifier (e.g., SID for Windows, User ID for Linux/Unix) 6. The MD5, SHA1, and SHA256 hashes of this file, etc.

The GUI 524 then receives a command from a user to recover an infected snapshot at operation 914. The privilege determinator 518 then determines at operation 916 if the user has sufficient privileges to recover an infected snapshot based on the user privileges 520, which lists recovery privileges for users for infected snapshots and files. If the user has insufficient privileges, the recoverer 516 will not recover the infected snapshot and the method 900 ends. Otherwise, if the user has sufficient privileges at operation 916 then the recoverer 516 will recover (e.g., mount, restore, examine, read, etc.) the selected infected snapshot at operation 918. Optionally, the selected snapshot can be recovered to a sandboxed virtual machine. The method 900 then ends.

In an embodiment the method 900 may further comprise propagating the quarantine status to other infected snapshots (e.g., replicas of infected snapshots). Quarantine status may be indicated in metadata of a snapshot (e.g., via setting a bit) and the related snapshots can be marked similarly by looking up a record of snapshots and replicas and then marking metadata of the related (e.g., replica) snapshot.

Figure 10:
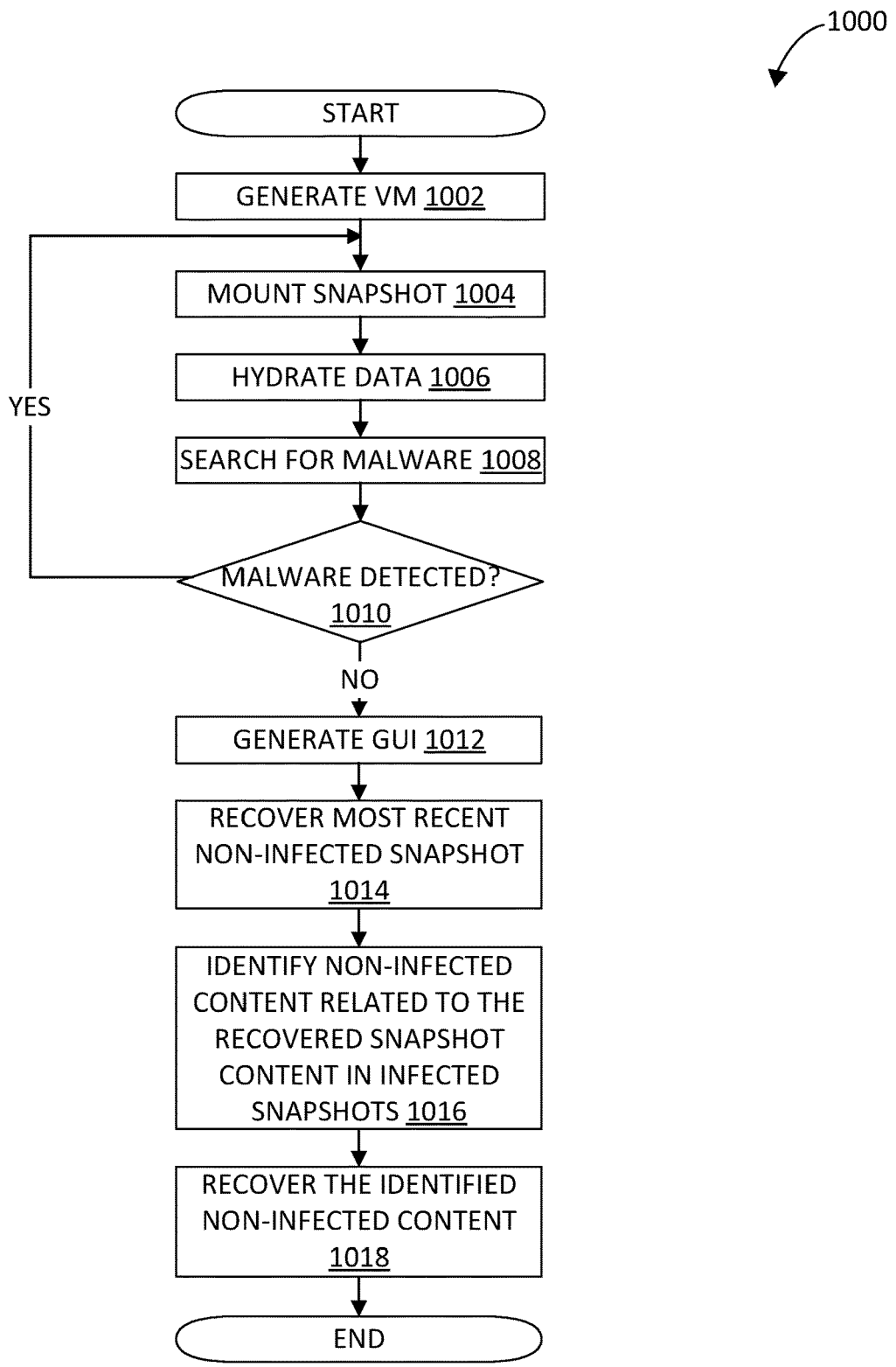
FIG. 10 depicts a flowchart illustrating a method of recovering non-infected content within an infected snapshot according to an example embodiment.

FIG. 10 depicts a flowchart illustrating a method 1000 of recovering non-infected content within an infected snapshot according to an example embodiment. In an example embodiment, the storage appliance 300 can execute the method 1000 using the malware engine 502. Example methods described herein may also be implemented in the form of executable instructions stored on a machine-readable medium or in the form of electronic circuitry. For instance, the operations of the method 1000 may be represented by executable instructions that, when executed by a processor of a computing device, cause the computing device to perform the method 1000. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 1002, the hypervisor 208 generates a virtual machine, e.g., virtual machine 220, which can be sandboxed (e.g., no network access to prevent the spread of malware to other parts of a network). A snapshot is then mounted at operation 1004, e.g., with Rubrik's LIVEMOUNT. The snapshot may be part of a snapshot chain and accordingly, a most recent snapshot may be mounted or a specific snapshot selected for mounting. Data within the snapshot is then hydrated with the hydrator 504 at operation 1006, which can include deduplicating data. The detector 508 then searches the mounted hydrated snapshot for malware at operation 1008. Searching can include applying YARA rules 510 and/or looking for matching hashes 512 (e.g., MD5, SHA1, and/or SHA256) and/or looking for specific file names (e.g., by name, such as ABAP/Rivpas.c.intd, and/or by path prefix) and/or path matches. The YARA rules 510 and/or hashes 512 may be imported (e.g., if new YARA rules 510 or hashes 512 are created) and the detector 508 can search for malware 1008 using all or a subset of the YARA rules 510 and/or hashes 512.

For example, given a set of Indicators of Compromise encoded as YARA rules in a CISA alert (such as Alert (AA20-302A) Ransomware Activity Targeting the Healthcare and Public Health Sector), the detector 508 may identify any snapshots, file paths, or both, where those indicators were found. Or, given a set of suspicious file hashes or file paths (such as from Microsoft's Hafnium IOC list), the detector 508 may identify those snapshots, file paths, or both as well.

Further, the detector 508 may restrict a search to a specific snapshots or range of snapshots, a subset of files/directories and/or scan a replica of a snapshot instead an original snapshot. Restricting the search can include specific subsets of files or directories; file size limits, file creation/ modification timestamps (e.g., before, after between timestamp(s)); file ownership; and files added/modified in a current snapshot (i.e., files that were not in prior snapshot or modified since that snapshot).

If, at operation 1010, malware is detected, then a next most recent snapshot in the snapshot chain is mounted and the process is repeated until no malware is detected at operation 1010. Further, in case of false negatives, additional snapshots in the chain can be scanned after no malware is detected in operation 1010. Alternatively, the mounting 1004 through the detecting 1010 can start with an oldest or base snapshot and assuming no malware was detected in the base snapshot, repeating the process until malware is detected.

Further, the mounting 1004 through the detecting 1010 can be repeated for all objects of a system including virtual machines, file systems, databases, network attached storage, etc. When malware is detected, metadata in the snapshot can be adjusted to indicate quarantine status. For example, quarantine-related metadata for the infected snapshots (e.g., quarantine status metadata, among other quarantine-related metadata) may be updated for the infected snapshot.

At operation 1012, the GUI 524 generates an interface, such as the example interface 700. For each object, the example interface 700 can show snapshots over time with a status (e.g., color coded) of each snapshot (infected, not infected, encrypted, infected and partially encrypted). The example interface 700 may also illustrate a cut point above which snapshots are quarantined (e.g., not recoverable, recovery not permitted, recoverable with sufficient user privileges, partially recoverable, etc.). The GUI 524 may display object(s) scanned (VM, Host/Share/fileset, etc.); snapshot(s) scanned; Date/time of scan; scan filter criteria; Hash/Rules, etc. being scanned for (e.g., for YARA Rules: i. Rule name ii. Namespace iii. Tags iv. Hash of the rule, etc.); number of matched files; and number of matches; etc.

The GUI 524 may also provide detailed results after a search including: 1. The file name & path where a match was found 2. The rule (hash, or YARA name, namespace and tags) that were matched 3. The time when this file was created 4. The time when this file was modified 5. The owner of this file a. Their fully qualified name (if retrievable) b. Any security identifier (e.g., SID for Windows, User ID for Linux/Unix) 6. The MD5, SHA1, and SHA256 hashes of this file, etc.

At operation 1014, the most recent non-infected snapshot is recovered (e.g., mounted, restored, etc.). Then, non-infected content related to the recovered snapshot is identified in more recent infected snapshots based on the prior searching 1008 at operation 1016. Then content (e.g., files) from the non-infected snapshot selected by a user can be recovered in the more recent snapshots using forward incremental recovery until an infected or encrypted content is reached corresponding to the selected content. Alternatively, all content can be restored using forward incremental recovery for each content until infected or encrypted content is reached. In this way, the most recent non-infected content available is recovered even if some of the snapshots holding relevant content are infected.

For example, for a selected content including a file in a non-infected snapshot, that file can first be recovered in the most recent non-infected snapshot, then starting with the next (infected) snapshot in the snapshot chain, the next incremental file can be recovered, and repeated until infected or encrypted content is reached. Alternatively, as the snapshots have already been searched for malware at 1008, the most recent infected snapshot with the selected file can be identified and the selected file recovered from that infected snapshot. In effect, while the example interface 700 shows a cut point at the snapshot level, there may be a cut point further up in the snapshot chain on a finer grained level (e.g., content level). The method 1000 then ends.

The following set of examples describe various embodiments of methods, computer-readable media, and systems (e.g., machines, devices, or other apparatus) discussed herein.

A method is described. The method may include identifying a most recent snapshot in a snapshot chain that is not infected by malware, wherein said identifying comprises mounting snapshots in the snapshot chain and determining whether said snapshots are infected by malware; receiving a selection, from a user, of an infected snapshot, the infected snapshot being more recent than the identified most recent snapshot; mounting the selected infected snapshot; determining which content in the selected infected snapshot are not infected; and recovering at least one of the non-infected content.

An apparatus is described. The apparatus may include a processor, memory coupled with the processor, and instructions stored in the memory. The instructions may be executable by the processor to cause the apparatus to identify a most recent snapshot in a snapshot chain that is not infected by malware, wherein said identifying comprises mounting snapshots in the snapshot chain and determining whether said snapshots are infected by malware; receive a selection, from a user, of an infected snapshot, the infected snapshot being more recent than the identified most recent snapshot;

mounting the selected infected snapshot; determine which content in the selected infected snapshot are not infected; and recover at least one of the non-infected content.

Another apparatus is described. The apparatus may include means for identifying a most recent snapshot in a snapshot chain that is not infected by malware, wherein said identifying comprises mounting snapshots in the snapshot chain and determining whether said snapshots are infected by malware; receiving a selection, from a user, of an infected snapshot, the infected snapshot being more recent than the identified most recent snapshot; mounting the selected infected snapshot; determining which content in the selected infected snapshot are not infected; and recovering at least one of the non-infected content.

A non-transitory computer-readable medium storing code is described. The code may include instructions executable by a processor to identify a most recent snapshot in a snapshot chain that is not infected by malware, wherein said identifying comprises mounting snapshots in the snapshot chain and determining whether said snapshots are infected by malware; receive a selection, from a user, of an infected snapshot, the infected snapshot being more recent than the identified most recent snapshot; mounting the selected infected snapshot; determine which content in the selected infected snapshot are not infected; and recover at least one of the non-infected content.

In some examples of the method, apparatuses, and non-transitory computer-readable medium described herein, the identifying comprises mounting the snapshots in the snapshot chain in reverse chronological order.

In some examples of the method, apparatuses, and non-transitory computer-readable medium described herein, the mounting and the determining is repeated until a non-infected snapshot in the snapshot chain is identified.

In some examples of the method, apparatuses, and non-transitory computer-readable medium described herein, the mounting and the determining is repeated past a non-infected snapshot in the snapshot chain is identified.

Some examples of the method, apparatuses, and non-transitory computer-readable medium described herein may further include operations, features, means, or instructions for repeating the identifying for all objects in a system.

In some examples of the method, apparatuses, and non-transitory computer-readable medium described herein, the determining comprises applying YARA rules and hash matching to the mounted snapshot.

In some examples of the method, apparatuses, and non-transitory computer-readable medium described herein, the mounting mounts snapshots in a sandboxed virtual machine.

Some examples of the method, apparatuses, and non-transitory computer-readable medium described herein may further include operations, features, means, or instructions for hydrating data in a mounted snapshot before the determining.

Some examples of the method, apparatuses, and non-transitory computer-readable medium described herein may further include operations, features, means, or instructions for displaying a graphical user interface showing individual snapshots in the snapshot chain, wherein a representation of a snapshot indicates whether said snapshot is infected with malware and displaying on the graphical user interface a cut point between infected and non-infected snapshots in the snapshot chain, wherein only non-infected content in the infected snapshots above the cut point can be recovered.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although examples have been described with reference to specific example embodiments or methods, it will be evident that various modifications and changes may be made to these embodiments without departing from the broader scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:
1. A method, comprising:
  displaying a graphical user interface showing:
    at least a portion of respective snapshot chains for respective computing objects of a plurality of computing objects, wherein the respective snapshot chains are represented as one or more individual snapshots, wherein a representation of an individual snapshot indicates whether the individual snapshot is infected with malware, and wherein a first computing object of the plurality of computing objects is a first virtual machine, a first file system, a first database, or a first network attached storage system, and a second computing object of the plurality of computing objects is a second virtual machine, a second file system, a second database, or a second network attached storage system, and
    across the respective snapshot chains, a cut line delineating infected snapshots from non-infected snapshots, wherein snapshots above the cut line are restricted from being recovered;
  receiving a selection, from a user, of an infected snapshot in a snapshot chain of the respective snapshot chains associated with a computing object of the respective computing objects, wherein the infected snapshot is more recent than a most recent non-infected snapshot identified in the snapshot chain and is positioned above the cut line;

mounting, in response to the selection, the selected infected snapshot;
determining, based at least in part on mounting the selected infected snapshot, which content in the selected infected snapshot are not infected;
receiving, based at least in part on the selection, a command to recover, for the respective computing objects, non-infected data; and
recovering, in response to the command, for the respective computing objects, a non-infected snapshot from the respective snapshot chains in accordance with the cut line and at least one of the non-infected content in the selected infected snapshot.

2. The method of claim 1, further comprising:
identifying a most recent snapshot in the respective snapshot chains that is not infected by malware, wherein the identifying comprises mounting snapshots in the respective snapshot chains in reverse chronological order and determining whether the mounted snapshots are infected by malware.

3. The method of claim 2, wherein mounting the snapshots and determining whether the mounted snapshots are infected is repeated until at least one non-infected snapshot in the respective snapshot chains is identified.

4. The method of claim 2, wherein mounting the snapshots and determining whether the mounted snapshots are infected is repeated past at least one non-infected snapshot in the respective snapshot chains being identified.

5. The method of claim 2, further comprising:
repeating the identifying for all computing objects in a system.

6. The method of claim 2, wherein determining whether the mounted snapshots are infected comprises:
applying YARA rules and hash matching to the mounted snapshots.

7. The method of claim 2, wherein mounting the snapshots comprises mounting the snapshots in a sandboxed virtual machine.

8. The method of claim 2, further comprising:
hydrating data in a mounted snapshot before determining whether the mounted snapshots are infected.

9. An apparatus, comprising:
a processor; and
a memory storing instructions that, when executed by the processor, cause the apparatus to:
display a graphical user interface showing:
at least a portion of respective snapshot chains for respective computing objects of a plurality of computing objects, wherein the respective snapshot chains are represented as one or more individual snapshots, wherein a representation of an individual snapshot indicates whether the individual snapshot is infected with malware, and wherein a first computing object of the plurality of computing objects is a first virtual machine, a first file system, a database, or a first network attached storage system, and a second computing object of the plurality of computing objects is a second virtual machine, a second file system, a second database, or a second network attached storage system, and
across the respective snapshot chains, a cut line delineating infected snapshots from non-infected snapshots, wherein snapshots above the cut line are restricted from being recovered;
receive a selection, from a user, of an infected snapshot in a snapshot chain of the respective snapshot chains associated with a computing object of the respective computing objects, wherein the infected snapshot is more recent than a most recent non-infected snapshot identified in the snapshot chain and is positioned above the cut line;
mount, in response to the selection, the selected infected snapshot;
determine, based at least in part on mounting the selected infected snapshot, which content in the selected infected snapshot are not infected;
receive, based at least in part on the selection, a command to recover, for the respective computing objects, non-infected data; and
recover, in response to the command, for the respective computing objects, anon-infected snapshot from the respective snapshot chains in accordance with the cut line and at least one of the non-infected content in the selected infected snapshot.

10. The apparatus of claim 9, wherein the instructions are further executable by the processor to cause the apparatus to:
identify a most recent snapshot in the respective snapshot chains that is not infected by malware, wherein, to identify the most recent snapshot, the instructions are further executable by the processor to cause the apparatus to:
mount snapshots in the respective snapshot chains in reverse chronological order and determine whether the mounted snapshots are infected by malware.

11. The apparatus of claim 10, wherein the instructions are further executable by the processor to cause the apparatus to:
repeat mounting the snapshots and determining whether the mounted snapshots are infected until at least one non-infected snapshot in the respective snapshot chains is identified.

12. The apparatus of claim 10, wherein the instructions are further executable by the processor to cause the apparatus to:
repeat mounting the snapshots and determining whether the mounted snapshots are infected past at least one non-infected snapshot in the respective snapshot chains being identified.

13. The apparatus of claim 10, wherein the instructions are further executable by the processor to cause the apparatus to:
repeat the identifying for all computing objects in a system.

14. The apparatus of claim 10, wherein, to determine whether the mounted snapshots are infected, the instructions are further executable by the processor to cause the apparatus to:
apply YARA rules and hash matching to the mounted snapshots.

15. The apparatus of claim 10, wherein, to mount the snapshots, the instructions are further executable by the processor to cause the apparatus to mount the snapshots in a sandboxed virtual machine.

16. The apparatus of claim 10, wherein the instructions are further executable by the processor to cause the apparatus to:
hydrate data in a mounted snapshot before determining whether the mounted snapshots are infected.

17. The apparatus of claim 10, wherein the instructions are further executable by the processor to cause the apparatus to:
quarantine snapshots determined to be infected so that the quarantined snapshots are restricted from recovery.

18. A non-transitory, computer-readable medium storing code comprising instructions executable by a processor of a device to cause the device to:
display a graphical user interface showing:
at least a portion of respective snapshot chains for respective computing objects of a plurality of computing objects, wherein the respective snapshot chains are represented as one or more individual snapshots, wherein a representation of an individual snapshot indicates whether the individual snapshot is infected with malware, and wherein a first computing object of the plurality of computing objects is a first virtual machine, a first file system, a first database, or a first network attached storage system, and a second computing object of the plurality of computing objects is a second virtual machine, a second file system, a second database, or a second network attached storage system, and
across the respective snapshot chains, a cut line delineating infected snapshots from non-infected snapshots, wherein snapshots above the cut line are restricted from being recovered;
receive a selection, from a user, of an infected snapshot in a snapshot chain of the respective snapshot chains associated with a computing object of the respective computing objects, wherein the infected snapshot is more recent than a most recent non-infected snapshot identified in the snapshot chain and is positioned above the cut line;
mount, in response to the selection, the selected infected snapshot;
determine, based at least in part on mounting the selected infected snapshot, which content in the selected infected snapshot are not infected;
receive, based at least in part on the selection, a command to recover, for the respective computing objects, non-infected data; and
recover, in response to the command, for the respective computing objects, a non-infected snapshot from the respective snapshot chains in accordance with the cut line and at least one of the non-infected content in the selected infected snapshot.

\* \* \* \* \*